US008290353B2

(12) United States Patent
Fujimoto et al.

(10) Patent No.: US 8,290,353 B2
(45) Date of Patent: Oct. 16, 2012

(54) DATA PROCESSING DEVICE AND METHOD

(75) Inventors: Kazuo Fujimoto, Shijonawate (JP);
Shinji Kojima, Kadoma (JP)

(73) Assignee: Panasonic Corporation, Osaka (JP)

( * ) Notice: Subject to any disclaimer, the term of this patent is extended or adjusted under 35 U.S.C. 154(b) by 1449 days.

(21) Appl. No.: 10/547,017

(22) PCT Filed: Feb. 24, 2004

(86) PCT No.: PCT/JP2004/002152
§ 371 (c)(1),
(2), (4) Date: Aug. 25, 2005

(87) PCT Pub. No.: WO2004/077825
PCT Pub. Date: Sep. 10, 2004

(65) Prior Publication Data
US 2006/0072399 A1 Apr. 6, 2006

(30) Foreign Application Priority Data
Feb. 27, 2003 (JP) ................................. 2003-050856

(51) Int. Cl.
*H04N 5/917* (2006.01)
*H04N 5/931* (2006.01)
*H04N 9/80* (2006.01)
(52) U.S. Cl. ..................... 386/356; 386/207; 386/248
(58) Field of Classification Search ................ None
See application file for complete search history.

(56) References Cited

U.S. PATENT DOCUMENTS 5,241,389 A * 8/1993 Bilbrey .................. 348/552
5,508,816 A   4/1996 Ueda et al.
5,808,722 A   9/1998 Suzuki
(Continued)

FOREIGN PATENT DOCUMENTS
EP   1067773   6/2000
(Continued)

OTHER PUBLICATIONS
International Search Report for corresponding PCT/JP2004/002152, mailed Jun. 8, 2004.
(Continued)

*Primary Examiner* — William C Vaughn, Jr.
*Assistant Examiner* — Heather Jones
(74) *Attorney, Agent, or Firm* — Renner, Otto, Boisselle & Sklar, LLP

(57) ABSTRACT

A data processor includes: a receiving section for receiving a data stream including first data on a compressed and encoded video content, first time information setting the presentation time of the first data, second data on a different type of content from the video content, and second time information setting the presentation time of the second data; a separating section for extracting the first data, first time information, second data and second time information from the data stream; a first decoding section for decoding the first data and outputting it in accordance with the first time information; and a second decoding section for outputting the second data in accordance with the second time information. The processor further includes a lag setting section for retaining lag information defining how much lag should be caused in presentation time if the first and second time information defines a time at which the first and second data are presented synchronously, modifying the second time information according to the lag information, and causing the lag in the presentation time of the second data.

16 Claims, 9 Drawing Sheets

U.S. PATENT DOCUMENTS

| | | | |
|---|---|---|---|
| 6,262,776 B1 * | 7/2001 | Griffits | 348/512 |
| 6,263,150 B1 | 7/2001 | Okada et al. | |
| 6,285,405 B1 * | 9/2001 | Binford et al. | 348/512 |
| 2002/0126703 A1 * | 9/2002 | Kovacevic | 370/487 |
| 2005/0238059 A1 * | 10/2005 | Lundblad et al. | 370/503 |

FOREIGN PATENT DOCUMENTS

| | | |
|---|---|---|
| EP | 1094674 | 4/2001 |
| JP | 06-076471 | 3/1994 |
| JP | 6-233269 | 8/1994 |
| JP | 07-307933 | 11/1995 |
| JP | 2001-128167 | 5/2001 |
| JP | 2003-284010 | 10/2003 |
| WO | 96/10889 | 4/1996 |

OTHER PUBLICATIONS

European Search Report for corresponding European patent application No. 04713985.2 issued May 11, 2009.

* cited by examiner

FIG.8
(a)
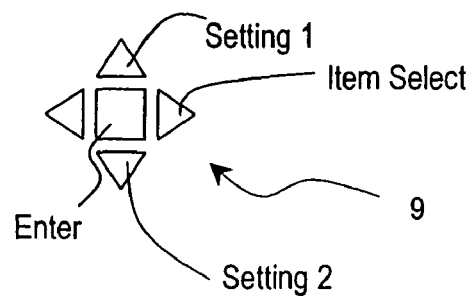
(b)
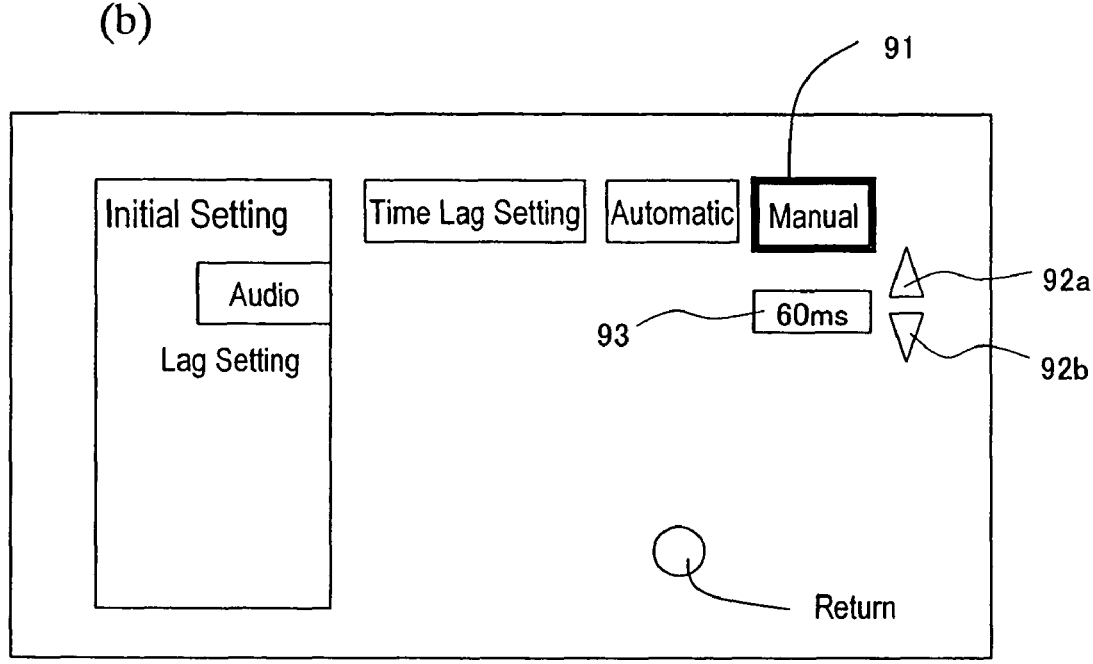

DATA PROCESSING DEVICE AND METHOD

TECHNICAL FIELD

The present invention relates to an apparatus and method for playing back compressed and encoded audio and video data with the audio and video synchronized with each other.

BACKGROUND ART

A data playback system (which will be simply referred to herein as a "player") for reading compressed and encoded video and audio signals from their storage medium such as a CD-ROM, a DVD-ROM, or a hard disk, decoding (or expanding) the signals and then outputting decoded data is known. When such a player sends the expanded data to a monitor or a loudspeaker, which is connected to the system, the playback of video and audio is realized.

A lot of standards have been defined as to compression coding. For example, an MPEG (Motion Picture Experts Group) standard is known as a standard for compressing and encoding both a video signal and an audio signal alike. According to an MPEG standard, to guarantee synchronous playback of video represented by a video signal and audio represented by an audio signal, time information, representing the time to present it, is added to each of the audio and video signals. Then, by making reference to these pieces of time information with respect to the system clock reference of the system equipment during expansion, the audio and video signals can be played back synchronously with each other.

Hereinafter, a conventional synchronizing method will be described. For example, according to the technique disclosed in Japanese Patent Application Laid-Open Publication No. 6-233269, first, the player senses the difference between a point in time when one of audio and video has been expanded and a point in time when the other has been expanded. Then, based on the magnitude of the difference sensed, the player changes the timing to transfer compressed data, the timing to activate an expander, and the timing to present the video, thereby synchronizing the audio and video together and outputting them to a monitor, a loudspeaker, and other external units.

However, this player outputs the audio and video to the external units after having synchronized them with each other internally. That is why if one of those external units processed the audio or video to produce some delay, then one of the audio and video could not be played back synchronously with the other anymore.

For example, suppose the external unit is a video display unit such as a TV set. In that case, if the video display unit performed any conversion processing such as an interlace/progressive conversion or an NTSC/PAL conversion or any image processing (such as magnifying or reducing the size of the video) at the user's request, then it would take a while to get such processing done. As a result, the playback of audio would precede that of video. For instance, if image processing to magnify the output image was requested, then some computations should be made to produce interpolated data from the original output image data. In that case, to generate smooth moving pictures, filter operations should be performed on the basis of a plurality of temporally continuous output frames or fields. Also, supposing the processing of combining two or more video streams output from the same circuit that can expand a plurality of incoming streams independently of each other, the video output of a particular stream might have to wait in order to synchronize all of those video streams together. Furthermore, in converting a video signal into an optical signal once and then transmitting the optical signal as in a theater system, it might take some time to get the video signal converted.

It might take several to several tens of milliseconds to get one, two or more of such computation processing done. If the playback of audio preceded that of video by a certain amount of time (approximately 30 milliseconds) or more, then the lag between the mouth movement of a person in the video and the output audio would be so noticeable as to make the viewer uncomfortable. The conventional player pays no attention at all to such a presentation time lag between audio and video caused by the processing performed by an external unit. That is why if the external unit carried out processing that would take an even longer time, then the video presentation time would be way behind the audio presentation time.

It is not impossible to play back the audio and the processed video synchronously with each other by providing the external unit with a buffer for causing a lag in the audio playback. In that case, however, the video data and audio data that have been output to the external unit have no time information to specify their presentation times, and the external unit should determine the output timings by itself, which is not an appropriate measure to take. Also, this technique of providing a buffer is not applicable to an existent external unit accepting no buffers, and therefore, cannot be called an ultimate solution.

In order to overcome the problems described above, an object of the present invention is to play back audio and video synchronously with each other just as originally intended even if the lag of the video playback varies according to the type of the external unit connected or the type of the processing adopted.

DISCLOSURE OF INVENTION

A data processor according to the present invention includes: a receiving section for receiving a data stream that includes first data on a compressed and encoded video content, first time information setting the presentation time of the first data, second data on a different type of content from the video content, and second time information setting the presentation time of the second data; a separating section for extracting the first data, the first time information, the second data and the second time information from the data stream; a first decoding section for decoding the first data and outputting the first data decoded in accordance with the first time information; and a second decoding section for outputting the second data in accordance with the second time information. The data processor further includes a lag setting section for retaining lag information that defines how much lag should be caused in presentation time in a situation where the first and second time information sets a time at which the first and second data are presented synchronously with each other, modifying the second time information according to the lag information, and causing the lag in the presentation time of the second data.

The content represented by the second data may have been compressed and encoded, and the second decoding section may decode the second data and include an internal buffer for storing the second data decoded.

The content represented by the second data may have been compressed and encoded. The data processor may further include a data buffer for storing the second data that has been compressed and encoded. And the data buffer may retrieve and output the compressed and encoded second data to the second decoding section before the presentation time set by the modified second time information.

The receiving section may receive the data stream continuously and the data buffer may store the second data sequentially. The capacity of the data buffer may be at least equal to the sum of the amount of the second data to receive before the presentation time, set by the second time information yet to be modified, is reached and the amount of the second data to receive before a period of time, corresponding to the lag of the presentation time, passes.

The data processor may further include a management section for managing a table that defines a correlation between address information showing the storage location of the second data in the data buffer and the second time information yet to be modified for the second data.

The management section may manage the table for a portion of the second data.

The receiving section may receive a data stream including the second data on at least one of audio and subtitles.

The lag setting section may receive a value specifying the lag from a user and retain the value as the lag information.

Alternatively, the lag setting section may retain a predetermined value as the lag information.

In that case, the lag setting section may retain lag information that defines the lag of the presentation time at least equal to 30 milliseconds.

The data processor may further include a transmitter for transmitting the first data to a connected device and receiving specific information, by which the device is to be identified, from the device. The transmitter may estimate, by reference to the specific information, an amount of time it will take for the device to carry out video processing on the first data. And the lag setting section may store the lag information by regarding the estimated amount of time as the lag.

The first and second decoding sections may be implemented as a single decoder.

A data processing method according to the present invention includes the steps of: receiving a data stream that includes first data on a compressed and encoded video content, first time information setting the presentation time of the first data, second data on a different type of content from the video content, and second time information setting the presentation time of the second data; extracting the first data, the first time information, the second data and the second time information from the data stream; and decoding the first data and outputting the first data decoded in accordance with the first time information. If the first and second time information sets a time at which the first and second data are presented synchronously with each other, the data processing method further includes the steps of: retaining lag information that defines how much lag should be caused in presentation time; causing the lag in the presentation time of the second data by modifying the second time information according to the lag information; and outputting the second data in accordance with the second time information.

The content represented by the second data may have been compressed and encoded, and the step of outputting the second data may include decoding the second data, storing the second data decoded in a data buffer and then outputting the second data.

The content represented by the second data may have been compressed and encoded. Then, the data processing method may further include the steps of: storing the compressed and encoded second data in a data buffer; and retrieving the second data stored from the data buffer before the presentation time set by the modified second time information. The step of outputting the second data may include outputting the second data that has been retrieved from the data buffer.

The step of receiving may include receiving the data stream continuously and the step of storing the second data may include storing the second data sequentially in the data buffer. The capacity of the data buffer may be at least equal to the sum of the amount of the second data to receive before the presentation time, set by the second time information yet to be modified, is reached and the amount of the second data to receive before a period of time, corresponding to the lag of the presentation time, passes.

The data processing method may further include the step of managing a table that defines a correlation between address information showing the storage location of the second data in the data buffer and the second time information yet to be modified for the second data.

The step of managing may include managing the table for a portion of the second data.

The step of receiving may include receiving a data stream including the second data on at least one of audio and subtitles.

The step of causing the lag may include receiving a value specifying the lag from a user and retaining the value as the lag information.

The step of causing the lag may include retaining a predetermined value as the lag information.

The step of causing the lag may include retaining lag information that sets the lag of the presentation time at least equal to 30 milliseconds.

The data processing method may further include the steps of: transmitting the first data to a connected device; receiving specific information, which makes it possible to identify the device, from the device; and estimating, by reference to the specific information, an amount of time it will take for the device to carry out video processing on the first data. The step of causing the lag may include retaining the lag information by regarding the estimated amount of time as the lag.

A computer program according to the present invention is executed by the computer of a data processor. A data processing method to be carried out by the computer following the program includes the steps of: receiving a data stream that includes first data on a compressed and encoded video content, first time information setting the presentation time of the first data, second data on a different type of content from the video content, and second time information setting the presentation time of the second data; extracting the first data, the first time information, the second data and the second time information from the data stream; and decoding the first data and outputting the first data decoded in accordance with the first time information. If the first and second time information sets a time at which the first and second data are presented synchronously with each other, the data processing method, being carried out by the computer, further includes the steps of: retaining lag information that defines how much lag should be caused in presentation time; causing the lag in the presentation time of the second data by modifying the second time information according to the lag information; and outputting the second data in accordance with the second time information.

BRIEF DESCRIPTION OF DRAWINGS

FIG. 8(a) shows an exemplary operating section of the audio lag setting section 9.

FIG. 8(b) shows an exemplary image for setting the time lag.

BEST NODE FOR CARRYING OUT THE INVENTION

In the following description, the data structure of a data stream will be described first, and then the configuration and operation of a data processor for carrying out the processing of the present invention by using such a data stream will be described.

Figure 1:
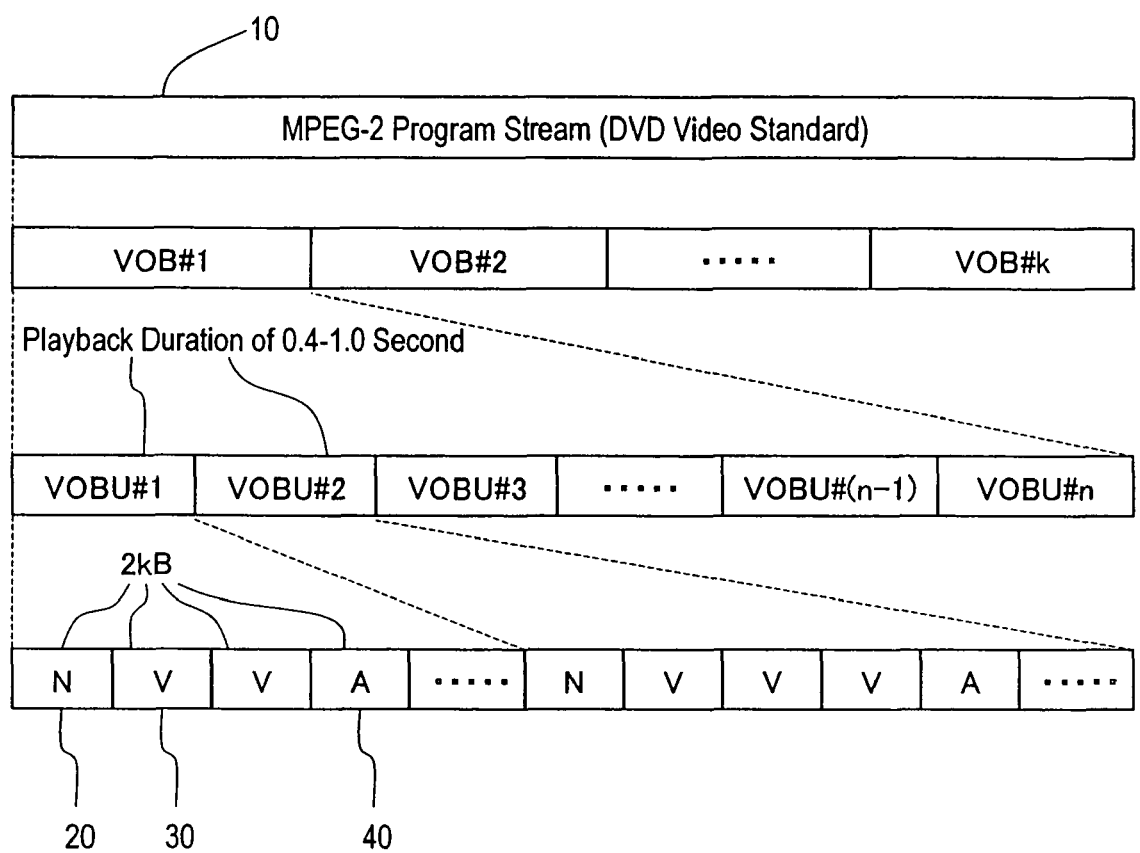
FIG. 1 shows a data structure for an MPEG-2 program stream 10.

FIG. 1 shows a data structure for an MPEG-2 program stream 10. The MPEG-2 program stream 10 (which will be simply referred to herein as a "data stream 10") has a data structure compliant with the DVD Video standard. The data stream 10 includes video data representing a video content and audio data representing an audio content. In the following description, the data stream is supposed to include video data and audio data. However, the data stream 10 may further include subtitle data and so on.

The data stream 10 includes a plurality of video objects (VOBs) #1, #2, . . . , and #k. Each VOB includes a plurality of VOB units (video object units; VOBUs) #1, #2, . . ., and #n. Each VOBU is a data unit containing data in an amount corresponding to a video playback duration of about 0.4 second to about 1 second. Hereinafter, the data structure of VOBUs will be described with VOBUs #1 and #2 taken as an example. It should be noted that the "playback" means to present video such as a video content or subtitles on a display unit (such as a TV) or to output audio as sound through an output unit such as a loudspeaker.

VOBU #1 is composed of a number of packs. In the data stream 10, each pack has a fixed data length (also called a "pack length") of 2 kilobytes (i.e., 2,048 bytes). At the top of the VOBU, a navigation pack (navi pack) 20 is positioned as indicated by "N" in FIG. 1. The navi pack 20 is followed by multiple video packs "V" (including a video pack 30) and multiple audio packs "A" (including an audio pack 40).

Each pack stores the following information. Specifically, the navi pack 20 stores various information for controlling the playback of the video and audio in the data stream 10, e.g., information representing the playback timing of the VOBU.

The video packs 30 store MPEG2-compressed video data thereon. The audio packs 40 store audio data that was compressed so as to comply with the MPEG-2 Audio standard, for example. In adjacent video and audio packs 30 and 40, video and audio data to be played back synchronously with each other may be stored. However, their arrangement (order) may be arbitrarily determined.

VOBU #2 is also made up of a plurality of packs. A navi pack 20 is located at the top of VOBU #2, and then followed by a plurality of video packs 30 and a plurality of audio packs 40. The contents of the information to be stored in these packs are similar to those of VOBU #1.

Figure 2:
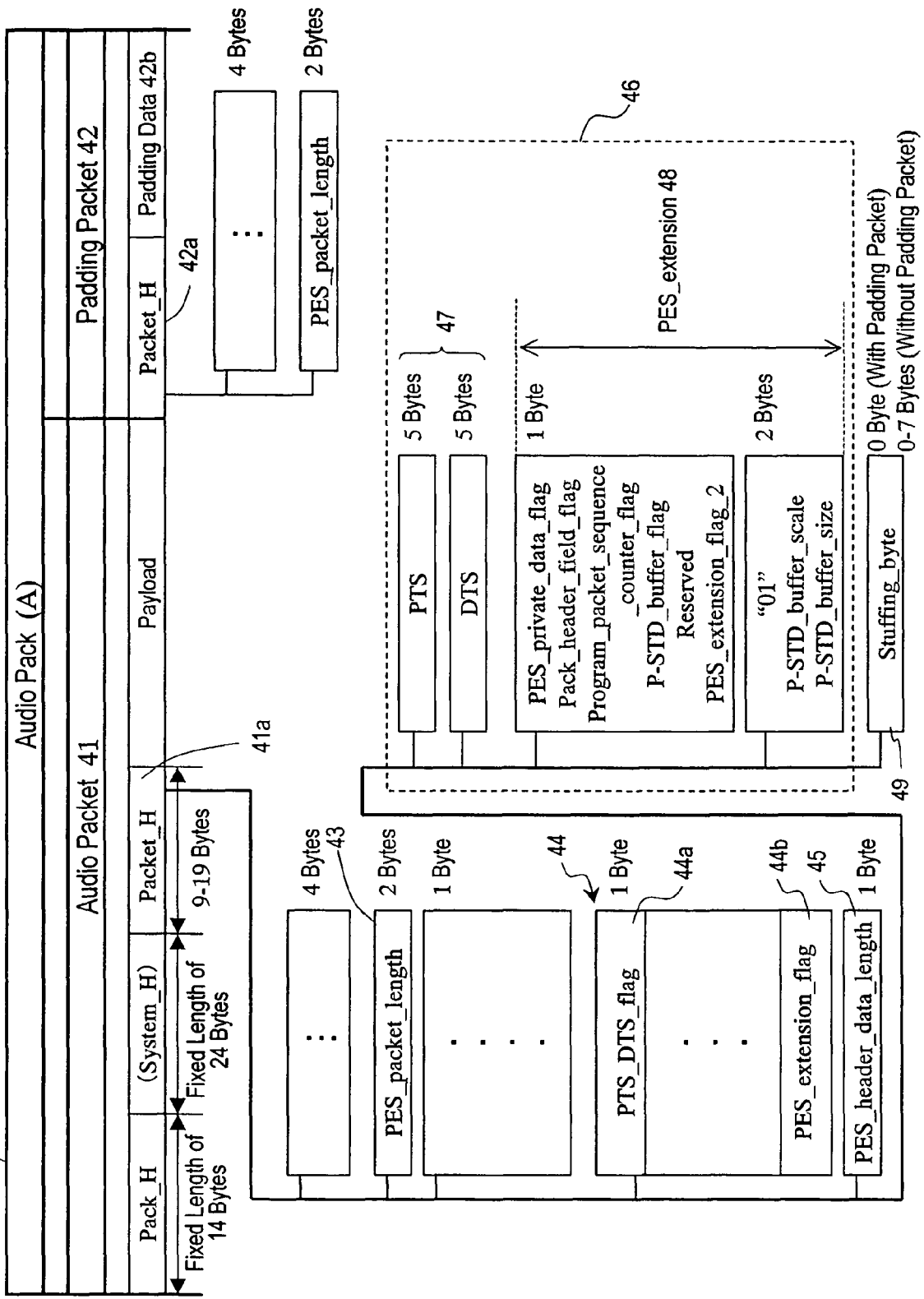
FIG. 2 shows a data structure for an audio pack 40.

Next, the data structure of an audio pack 40 will be described with reference to FIG. 2. FIG. 2 shows the data structure of the audio pack 40. The audio pack 40 includes an audio packet 41 and a padding packet 42. The padding packet 42 is provided to adjust the pack length of a data pack. Thus, no padding packets are provided if there is no need to adjust the pack length. In that case, only the audio packet 41 will be included in the audio pack 40.

The audio packet 41 includes a pack header (Pack_H) of 14 bytes, a system header (system_H) of 24 bytes, a packet header (Packet_H) 41a and a payload, which are arranged in this order from the top.

In the pack header, information showing the type of the pack (i.e., an audio packet in this case) is described. A system clock reference (SCR) is described as a piece of reference time information after the pack start code. The SCR is a piece of information for the encoder to set or modify the value of a sync signal STC (system time clock), which is used as a reference to activate the decoder, to its desired value while decoding a given stream. The SCR is basically added to any packet header and has a value measured by reference to a clock signal of 90 khz and represented in a length of 33 bits. The system header is always added to the first pack of each VOBU. The packet header 41a will be described in detail later. And in the payload, compressed and encoded video data is described.

To adjust the pack length, the audio pack 40 is provided with the padding packet 42 including a pack header 42 and padding data 42b. Under predetermined conditions, instead of providing the padding packet 42, a stuffing byte field 49 is provided within the packet header 41a. The padding packet 42 and the stuffing byte field 49 are never included in the same pack. In the example shown in FIG. 2, the padding packet 42 is included in the audio pack 40 and the stuffing byte field 49 has zero bytes. That is to say, there is no stuffing byte field.

Next, the data structure of the packet header 41a of the audio packet 41 will be described. The packet header 41a includes a packet length field 43, a flag field 44 and a header data length field 45. Depending on the values of a time flag field 44a and a PES extension flag field 44b, the packet header 41a may further include an additional field 46.

In the packet length field 43, a packet length (byte length) as measured from that field through the end of the audio packet 41 is described. The next flag field 44 includes a time flag field (PTS_DTS_flag) 44a and a PES extension flag field (PES_extension_flag) 44b. In the time flag field 44a, a flag showing whether or not there are a presentation time stamp (PTS) and a decoding time stamp (DTS) is described as will be mentioned later. In the PES extension flag field 44b, a flag showing whether or not there is a PES extension field 48 is described. And in the header data length field 45, the sum of the field lengths of the additional field 46 and a stuffing byte field 49 is stored.

Next, the additional field 46 will be described. According to an MPEG standard, to realize synchronous playback of video and audio, a time stamp value for managing the time to present video or audio is added to each video/audio decoding unit (called an "access unit"), which may be one frame for video and one audio frame for audio. This time stamp value is called a "presentation time stamp (PTS)". And an audio PTS (which will be referred to herein as an "APTS") is defined for audio, while a video PTS (which will be referred to herein as a "VPTS") is defined for video.

If the PTS matches the system time clock STC described above, then an access unit with that PTS is output for playback. Just like the SCR, the precision of the PTS is measured in response to a clock pulse of 90 khz and represented in a length of 33 bits. The precision of the PTS is measured at 90 khz because 90 khz is a common multiple of the frame frequency of the NTSC video system and that of the PAL video system and because a higher precision than one sample period of audio should be achieved.

Meanwhile, time stamp information, representing the order to decode compressed data, is also added. This time stamp value is called a "decoding time stamp (DTS)".

If PTS and DTS fields 47, each having a length of 5 bytes, are provided in the field 46, the time flag field 44a shows that there are both PTS and DTS. Depending on the value of the time flag field 44a, one of these two fields is provided. Also, a PES extension field 48 may be provided as the additional field 46. In the PES extension field 48, information required for decoding the program stream 10, e.g., the capacity of a decoding data buffer, is described.

The data structure of the audio pack is shown in FIG. 2. However, the video pack may have a similar data structure. Thus, the same statement applies to the video pack just by replacing the "audio packet" with a "video packet" and the "audio data" stored in the payload with "video data". In the video packet, the PTS and DTS with the same data structures as those mentioned above are described and the decoding and playback timings are defined just as described above.

Figure 3:
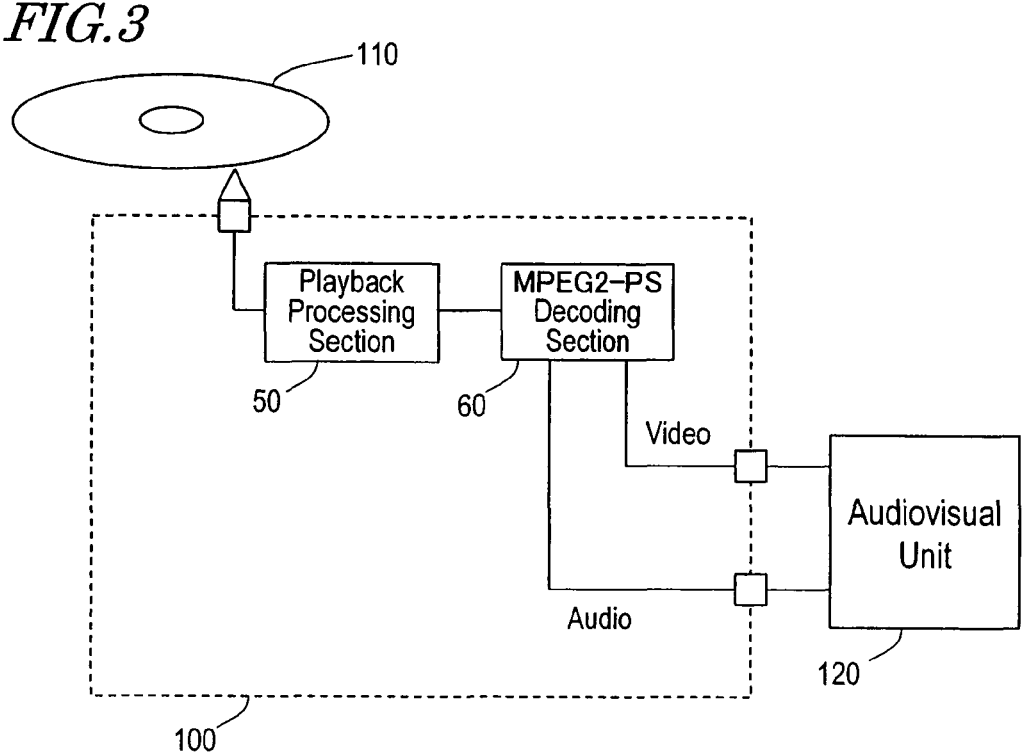
FIG. 3 shows a data processor 100 and an audiovisual unit 120 connected to the data processor 100.

Hereinafter, the configuration and operation of a data processor 100 according to this preferred embodiment will be described with reference to FIGS. 3 and 4. FIG. 3 shows a data processor 100 and an audiovisual unit 120 connected to the data processor 100. The data processor 100 reads a data stream 10 from an optical disk 110 such as a DVD-ROM via an optical pickup. A playback processing section 50 subjects the data stream 10, which has been read out as analog waves, to digitization processing and so on, thereby outputting it as a digital data stream. An MPEG2-PS decoding section 60 (which will be simply referred to herein as a "decoding section 60") separates this stream into video data and audio data, decodes both of these data, and then outputs them to the audiovisual unit 120.

The data processor 100 may be a DVD player, a DVD recorder or a PC, for example. If the optical disk 110 is replaced with a hard disk, then the data processor 100 may be a hard disk recorder. Also, in receiving the data stream 10 as a digital broadcast by way of an antenna, the data processor 100 may be implemented as a settop box or a digital satellite broadcast receiver, for example. On the other hand, the audiovisual unit 120 is an interface unit such as a monitor output unit like a TV set, an audio output amplifier, or an AV amplifier with an AV selector function. Just one audiovisual unit 120 is shown in FIG. 3. However, a plurality of units, including a video display unit and an audio output unit, may be provided.

One of the features of the data processor 100 of this preferred embodiment is that if video and audio that should be played back synchronously are actually played out of sync with each other due to various computation processing carried out by the audiovisual unit 120, then the preceding data is output after a certain time lag. For example, if the playback of video data delays behind that of audio data due to the interlace/progressive conversion performed by the audiovisual unit 120 on the video data, then the output of the preceding audio data is put off for an amount of time corresponding to the time delay of the presentation of the video data. As a result, the video data and the audio data can be played back synchronously with each other. The output of the audio data can be put off by modifying the PTS setting the presentation time of the audio data. The time lag is determined by an estimated time, a user specified time, and the amount of time it takes for the audiovisual unit 120 to finish the video processing, which can be calculated by identifying the audiovisual unit 120.

This feature of the data processor 100 is mainly formed by the decoding section 60 of the data processor 100. Hereinafter, the decoding section 60 will be described in detail.

Figure 4:
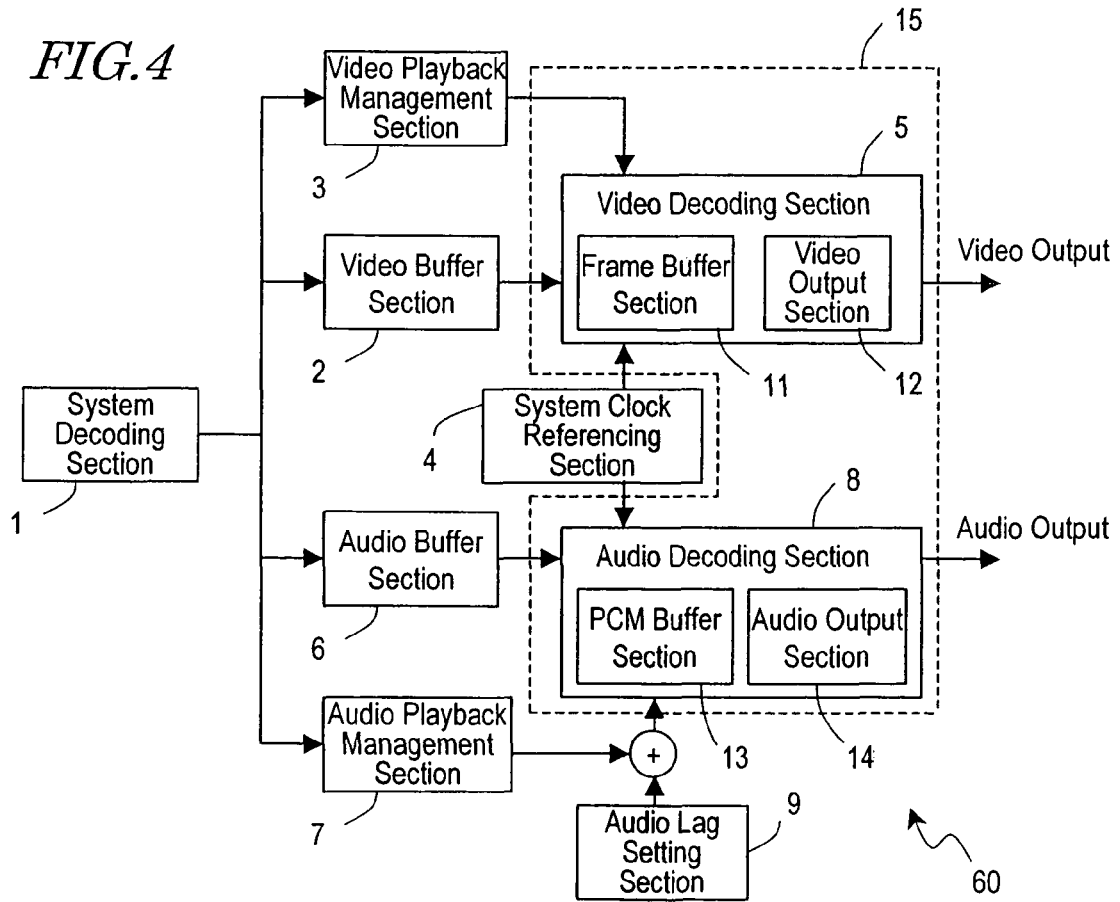
FIG. 4 shows a detailed arrangement of functional blocks in the decoding section 60.

FIG. 4 shows the detailed arrangement of functional blocks in the decoding section 60. The decoding section 60 includes a system decoding section 1, a video buffer section 2, a video playback management section 3, a system clock referencing section 4, a video decoding section 5, an audio buffer section 6, an audio playback management section 7, an audio decoding section 8 and an audio lag setting section 9.

The system decoding section 1 separately extracts the digitally compressed and encoded audio and video data from the data stream 10. Also, the system decoding section 1 extracts the PTS added to a video pack as video presentation time information and the PTS added to an audio pack as audio presentation time information, respectively.

First, components engaging in video processing will be described. The video buffer section 2 stores the video data that has been separated by the system decoding section 1. The video playback management section 3 compiles and manages a table showing a correlation between the video data stored in the video buffer section 2 and the video presentation time information.

The video decoding section 5 analyzes the attribute information (i.e., video header information) of the compressed and encoded video data, and decodes the video data stored in the video buffer section 2 in accordance with the video presentation time information. The video decoding section 5 includes a frame buffer section 11 and a video output section 12. The frame buffer section 11 stores the decoded video data. The video output section 12 outputs the video data from the decoding section 60. The video data is further output to the audiovisual unit 120 connected to the data processor 100.

Next, components engaging in audio processing will be described. The audio buffer section 6 is a semiconductor memory, which can store the audio data that has been separated by the system decoding section 1. Its buffer size changes with the compression rate of the encoded audio data to process, and may be in the range of several kB to several tens of kB, for example. The audio playback management section 7 compiles and manages a table showing a correlation between the audio data stored in the audio buffer section 6 and the audio presentation time information. This table will be described in detail later with reference to FIGS. 7(*a*) and 7(*b*).

The audio lag setting section 9 retains lag information, which defines how much lag should be caused in the audio presentation time, and modifies the audio presentation time information according to the lag information, thereby causing the lag in the presentation time. The audio lag setting section 9 may include a memory (not shown) to retain that lag information, which presets an estimated time lag in view of the processing to be done by the audiovisual unit 120. Optionally, the audio lag setting section 9 may also hold information about a time lag that has been specified by the user either on the basis of milliseconds or on a video frame basis. As a result, fine adjustment can be made according to the processing delay produced by the audiovisual unit 120.

The audio decoding section 8 analyzes the attribute information (i.e., audio header information) of the compressed and encoded audio data, and decodes the audio data stored in the audio buffer section 6 in accordance with the audio presentation time information. The audio decoding section 8 includes a PCM buffer section 13 and an audio output section 14. The PCM buffer section 13 stores the decoded audio data. The audio output section 14 outputs the audio data from the decoding section 60. The audio data is further output to the audiovisual unit 120 connected to the data processor 100.

It should be noted that the video decoding section 5 and the audio decoding section 8 described above have the same function of decoding. Accordingly, as long as their functions are realized, these two decoding sections 5 and 8 may be implemented as a single semiconductor integrated circuit. For example, FIG. 4 shows a decoder chip 15 including both the video decoding section 5 and the audio decoding section 8.

Next, a configuration for playing back the video data output from the video output section 12 and the audio data output from the audio output section 14 synchronously with each other will be described. The decoding timings and playback timings are set by the system clock referencing section 4. The system clock referencing section 4 generates a system time clock STC within the data processor 100 of an MPEG system. To get the STC generated by the data processor 100, an SCR value, defined for a program stream (PS) for use in a DVD disk, for example, may be used. As described above, the SCR is described in a pack header. If the incoming data stream is a transport stream (TS) for use in BS digital broadcasting, a program clock reference (PCR) may be used.

When the last byte of the video data arrives (i.e., when the data is received from the playback processing section 50), the system clock referencing section 4 defines the same value as the SCR as the system time clock STC, which is regarded as representing a reference time. Furthermore, by combining this STC value with a phase-locked loop (PLL) circuit (not shown), the frequency of the STC can be completely matched with that of a reference time system clock for the decoding section 60. The system time clock STC has a system clock frequency of 27 MHz. By getting the frequency of this STC divided by a counter, for example, each PTS (with a frequency of 90 khz) can be referred to.

If the data processor 100 performs the conventional processing, then the video decoding section 5 outputs an access unit, to which a VPTS matching the system time clock STC is added, and gets the unit played back. Meanwhile, the audio decoding section 8 outputs an access unit, to which an APTS matching the STC is added, and gets the unit played back. Since the PTS has a frequency of 90 khz, the video data and audio data are decoded so as to synchronize the STC with the VPTS or APTS within this precision range. As a result, video and audio can be played back synchronously with each other.

On the other hand, in the processing of this preferred embodiment, the data processor 100 realizes the synchronous playback of video and audio with the delay caused by the video processing of the audiovisual unit 120 taken into consideration. Hereinafter, this operation will be outlined with reference to FIG. 5 and then the procedure of processing to carry out that operation will be described with reference to FIG. 6.

Figure 5:
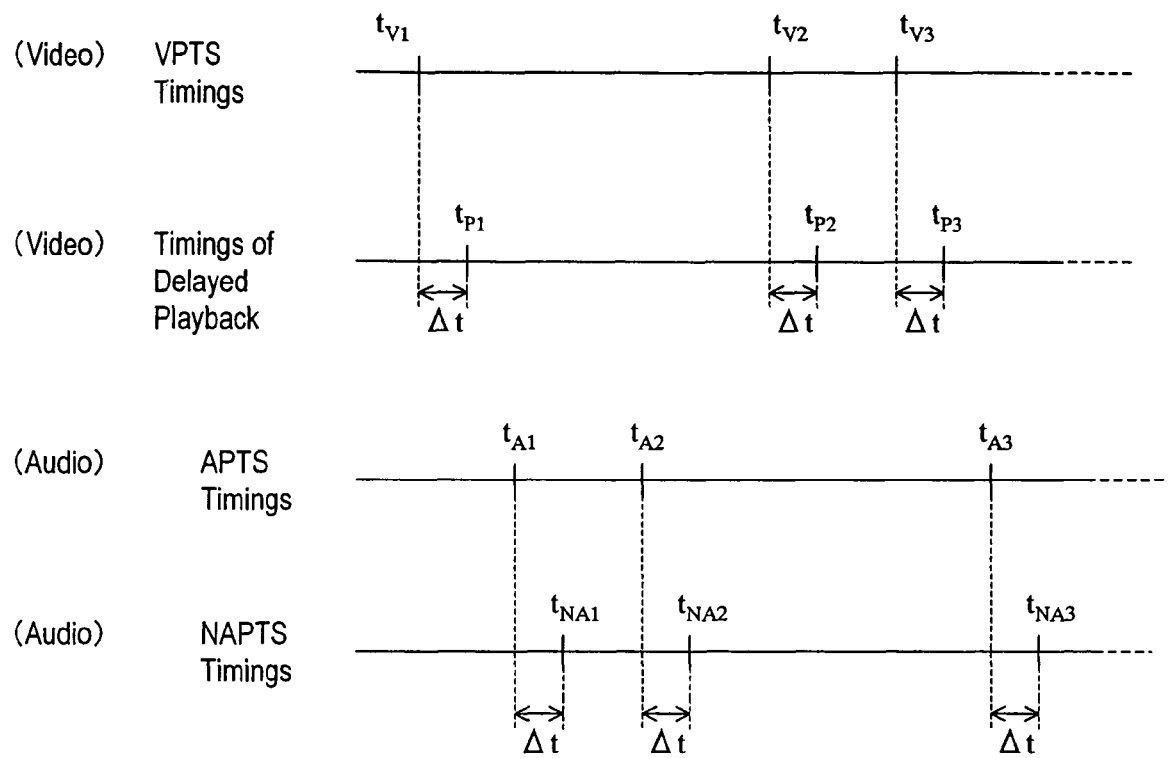
FIG. 5 shows playback timings to realize video/audio synchronous playback using PTS.

FIG. 5 shows playback timings for playing back video and audio synchronously with each other using PTS. The timings represented by presentation time information are shown on four rows.

Specifically, the first row shows the timings represented by the video presentation time information (VPTS) defined for the data stream 10. An encoder (not shown) that has generated the data stream 10 compresses and encodes the video at times $t_{V1}$, $t_{V2}$ and so on in order to play back the video. The interval between the times $t_{V1}$ and $t_{V2}$ is n times (where n is a natural number) as long as 33 milliseconds (i.e., 30 Hz) according to the NTSC standard and n times (where n is a natural number) as long as 40 milliseconds (i.e., 25 Hz) according to the PAL standard.

Next, the third row shows the audio presentation timings of the data stream 10. As in the video, the encoder (not shown) compresses and encodes the audio at times $t_{A1}$, $t_{A2}$ and so on in order to play back the audio. The interval between the times $t_{A1}$ and $t_{A2}$ is n times (where n is a natural number) as long as 21.12 milliseconds according to the Advanced Audio Coding (AAC) standard, for example.

On the other hand, the second row of FIG. 5 shows the timings of video playback that has been delayed due to the video processing done by the audiovisual unit 120. For example, looking at the video to be presented first, it can be seen that the video that should have been presented at the time $t_{V1}$ is actually presented at a time $t_{p1}$, which is later than the time $t_{V1}$, due to a delay caused by the video processing. The time delay is supposed herein to be Δt.

Next, the fourth row shows the audio playback timings after the audio lag setting section 9 of this preferred embodiment has modified the original audio presentation time information (APTS). The audio lag setting section 9 modifies the audio presentation time information (APTS), indicating that the audio should be played back at the time $t_{V1}$, into time information (NAPTS) indicating that the playback of audio should be put off by the video processing delay Δt caused by the audiovisual unit 120, thereby causing the lag in the audio presentation time. As a result, the video data are output from the video output section 12 at the timings indicated on the first row (i.e., at the times $t_{V1}$, $t_{V2}$ and so on) and then played back at the timings indicated on the second row (i.e., at the times $t_{p1}$, $t_{p2}$ and so on). On the other hand, the audio data are output from the audio output section 14 at the timings indicated on the third row and then played back at the timings indicated on the fourth row (i.e., at the times $T_{NA1}$, $T_{NA2}$ and so on). By shifting the audio presentation times by the time delay Δt caused by the video processing, the video and audio can be played back at the playback timings that were originally intended during the encoding process. Consequently, even video and audio that should be played back synchronously with each other can be played back in sync with each other just as intended.

It should be noted that the "synchronous playback" of video and audio refers herein to a situation where the video playback timing falls within a certain time range (e.g., 50 milliseconds ahead of through 30 millisecond behind) with respect to the audio playback timing. Thus, it does not always refer to the situation where the video and audio PTS perfectly match each other.

If there is a time lag of 30 milliseconds or more between the video and audio presentations, then the viewer may feel uncomfortable. Accordingly, if the earliest VPTS is 50 milliseconds (more exactly, 30 milliseconds) ahead of the NAPTS and if the latest VPTS is 30 milliseconds behind the NAPTS, then the "synchronous playback" is virtually realized for the viewer.

Figure 6:
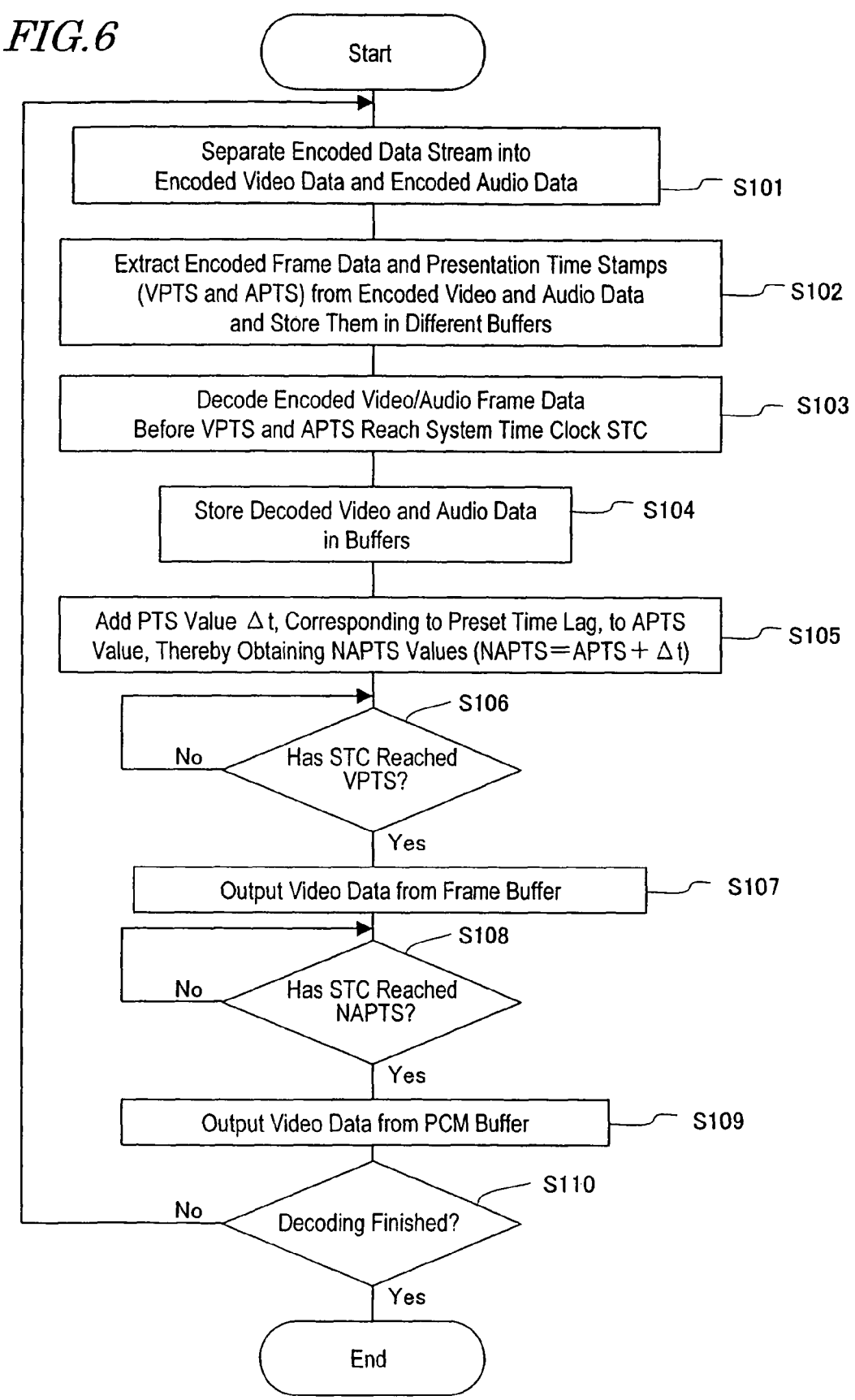
FIG. 6 is a flowchart showing the procedure of processing carried out by the decoding section 60 of this preferred embodiment.

FIG. 6 shows the procedure of processing done by the decoding section 60 of this preferred embodiment. First, in Step S101, the system decoding section 1 separates the given encoded data stream into encoded video data and encoded audio data. Next, in Step S102, the system decoding section 1 extracts encoded frame data and presentation time information (VPTS and APTS) from the encoded video and audio data. The encoded video and audio frame data are stored in the video buffer section 2 and audio buffer section 6, respectively, and the presentation time information (VPTS and APTS) is sent to the video playback management section 3 and audio playback management section 7.

Figure 7:
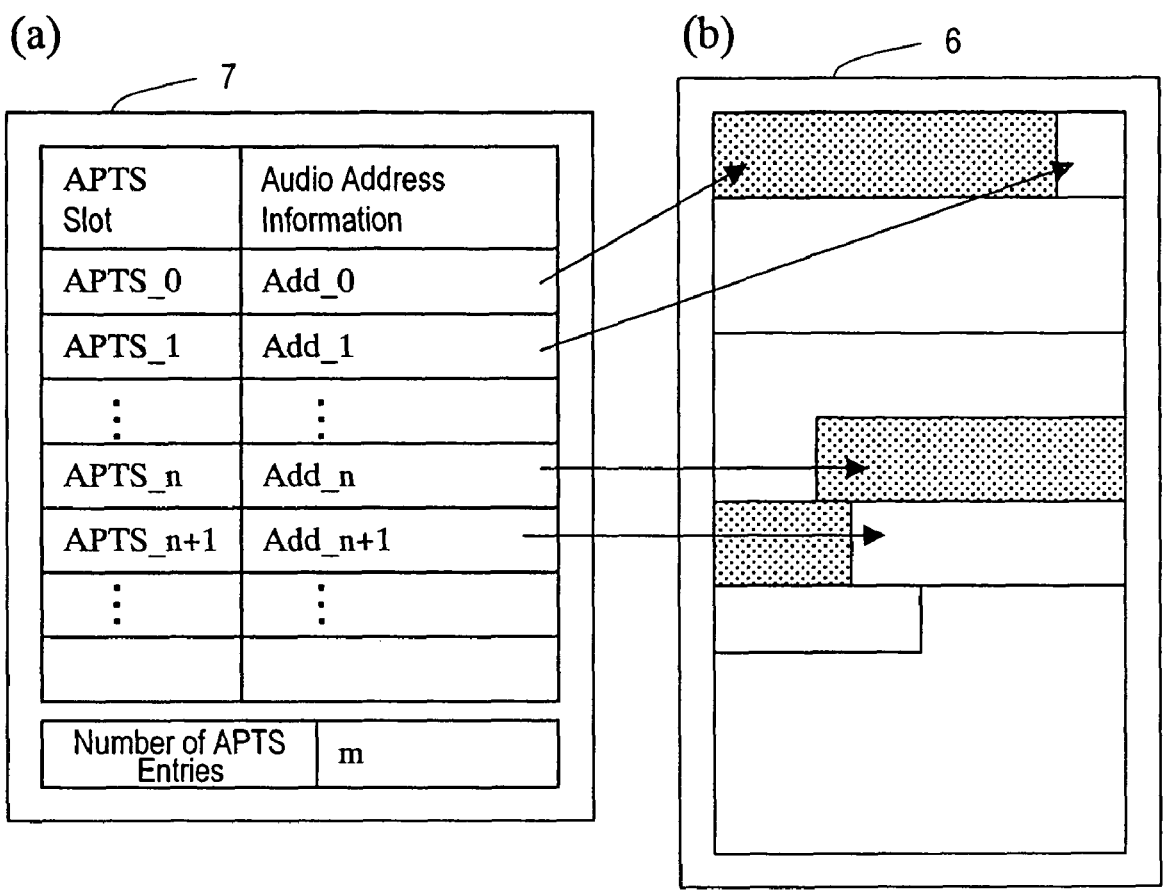
FIG. 7(a) shows the format of a table generated by the audio playback management section 7.
FIG. 7(b) shows a relationship between the data arrangement of audio data stored in the audio buffer section 6 and the locations of the data to make reference to by the audio address information.

FIG. 7(*a*) shows the format of a table compiled by the audio playback management section 7. This table associates the audio data stored in the audio buffer section 6 with the audio presentation time information. First, the audio playback management section 7 divides the audio data into a plurality of units called "slots" on an APTS basis, and then associates each of those slots with the audio address information. The audio address information makes reference to the top address of the audio data to be played back in its associated slot and stored in the audio buffer section 6.

FIG. 7(*b*) shows a relationship between the data arrangement of the audio data stored in the audio buffer section 6 and the locations of the data to be referred to by the audio address information.

Referring back to FIG. 6, in Step S103, the video decoding section 5 and audio decoding section 8 decode the encoded video/audio frame data before the VPTS and APTS reach the system time clock STC. Next, in Step S104, the video and audio decoding sections 5 and 8 store the decoded video and audio data in the frame buffer section 11 and PCM buffer section 13, respectively.

Next, in Step S105, the audio lag setting section 9 adds a PTS value Δt, corresponding to a preset time lag, to each APTS value, thereby obtaining new audio presentation time information NAPTS values (i.e., NAPTS=APTS+Δt). As a result of these processing steps, new presentation time information NAPTS is obtained by modifying the audio presentation time information APTS.

In this preferred embodiment, the time lag is supposed to be specified by the user in advance. FIG. 8(*a*) shows an exemplary operating section for the audio lag setting section 9. If the user presses the item select key shown in FIG. 8(*a*) on the initial setting screen, then the processor is switched into a mode in which the audio time lag can be set. FIG. 8(*b*) shows an exemplary screen for setting the audio time lag. If the user moves the on-screen highlight 91 to "manual" using the operating section and presses down the enter key, then the processor is switched into a manual time lag setting mode. Also, if the user presses down the upward arrow key identified by "setting 1" in FIG. 8(*a*) while monitoring the display window 93, then the on-screen "increase" button 92*a* is highlighted, thereby increasing the time lag. Conversely, if the user presses down the downward arrow key identified by "setting 2", then the on-screen "decrease" button 92*b* is highlighted, thereby decreasing the time lag. In FIG. 8, the time lag to cause is set to 60 ms. The PTS value Δt is determined by the time lag set. For example, if the time lag is set to t (ms), then the PTS value Δt=90.9 t or 91 t.

Next, in Step S106, the video decoding section 5 determines whether or not the system time clock STC has reached the VPTS. If the answer is YES, then the video output section 12 outputs the video data from the frame buffer in Step S107. Otherwise, the video output section 12 waits until the STC reaches the VPTS. Next, in Step S108, the audio decoding section 8 determines whether or not the STC has matched the NAPTS, which means that the STC has either matched or exceeded the NAPTS. If the answer is YES, then the audio output section 14 outputs the video data from the PCM buffer in Step S109. Otherwise, the audio output section 14 waits until the STC reaches the NAPTS.

Thereafter, in Step S110, the video decoding section 5 and audio decoding section 8 determine whether or not the decoding process is finished. If the answer is YES, then the process ends. Otherwise, the process continues by returning to Step S101. The process also ends when the user instructs the processor to stop the playback.

The operation of the data processor 100 of this preferred embodiment has been described about the operation of the decoding section 60, in particular.

In the preferred embodiment described above, the compressed and encoded audio data is decoded and then the PCM data is stored on the buffer. Alternatively, the audio data may be stored in the audio buffer section 6 before the decoding section 60 starts decoding. This is because the compressed and encoded audio data yet to be decoded is smaller in size than the PCM data decoded and the audio buffer section 6 may have a smaller buffer size. More specifically, after the audio encoded frame data has been stored on the audio buffer section 6, a PTS value Δt, corresponding to the preset time lag, may be added to the audio presentation time APTS, thereby obtaining an NAPTS value (NAPTS=APTS+Δt). This means to perform the processing step S105 after Step S102 and before Step S103 shown in FIG. 6. The other processing steps are carried out as shown in FIG. 6.

Figure 9:
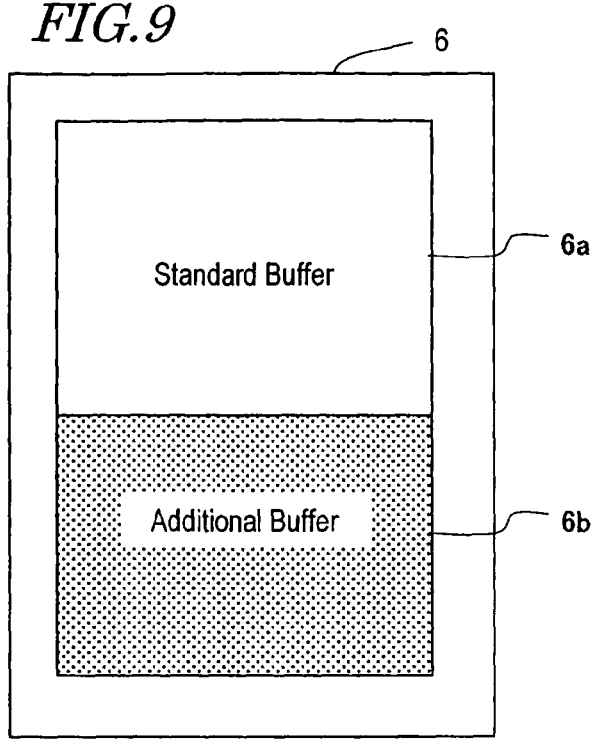
FIG. 9 shows an exemplary configuration for the audio buffer section 6.

FIG. 9 shows an exemplary configuration for the audio buffer section 6. The audio buffer section 6 includes a standard buffer 6*a* for storing the encoded audio data when there is no audio lag and an additional buffer 6*b* for storing additional encoded audio data when there is an audio lag. The additional buffer 6*b* is provided for the following reason. Specifically, if there is an audio lag, the audio data that should have been output at the time represented by the APTS according to the conventional processing is not output until NAPTS according to the processing of this preferred embodiment. That is why an additional buffer capacity is needed to store data that has been read in an amount of time Δt (=NAPTS−APTS).

Consequently, the audio buffer section 6 should have a buffer capacity that is at least equal to the sum of the amount of the encoded audio data to receive before the presentation time, set by the original APTS, is reached and the amount of the encoded audio data to receive before a period of -time, corresponding to the lag Δt of the presentation time, passes. The former capacity is covered by the standard buffer 6*a*, while the latter capacity is covered by the additional buffer 6*b*.

For example, suppose the additional buffer 6*b* should store additional data, of which the maximum amount corresponds to 100 milliseconds. This is a situation where the maximum time lag is 100 milliseconds, which is approximately equal to a total playback duration of three video frames according to the NTSC output system. In that case, the additional buffer 6*b* needs to have a capacity of about 22 kilobytes according to the AAC format, which is an audio compression format adopted in BS Digital Broadcasting (where the amount of data calculated corresponds to six channels when each channel has a transfer rate of 288 kilobits per second). This capacity is several times as small as the capacity needed to store decoded PCM data additionally.

It should also be noted that since the amount of the encoded audio frame data stored in the audio buffer section 6 increases, the size of the table in the audio playback management section 7 should be increased, too.

Figure 10:
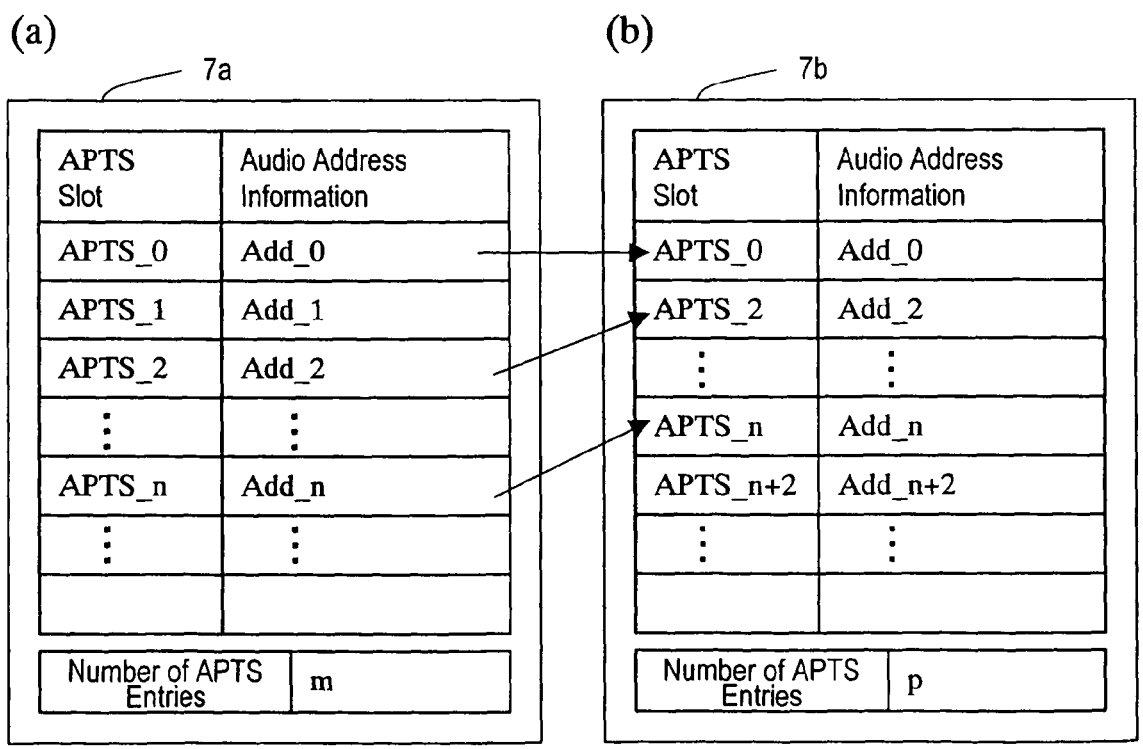
FIG. 10(a) shows the format of the table 7a of the audio playback management section 7 before decimation.
FIG. 10(b) shows the format of the table 7b of the audio playback management section 7 after the decimation.

However, if not all of the audio presentation time information (APTS) is stored in the audio playback management section 7 but if the table is compiled by decimating part of that information, then the increase in table size can be avoided. FIG. 10(a) shows the format of a table 7a of the audio playback management section 7 before the decimation. FIG. 10(b) shows the format of a table 7b of the audio playback management section 7 after the decimation. The table 7b is compiled by decimating odd-numbered items of the presentation time information APTS of the table 7a. If the audio playback management section 7 compiles the table 7b in real time, then the relation between the presentation time information APTS and its associated address information may be described every other item. In that case, the amount of data in the table 7b will be half of that in the table 7a. In other words, if the table size remains the same, then the table 7b can manage twice as large an amount of audio data as the table 7a can. It should be noted that by decimating the presentation time information (APTS) and its associated address information, the APTS information needed for synchronization decreases and therefore, the frequency of synchronization decreases, too. However, even if the amount of data to manage increases, the playback of video and audio can be synchronized with each other just as intended.

In the preferred embodiment described above, the video decoding section 5 and audio decoding section 8 decode the compressed and encoded video and audio data and retain them in the frame buffer section 11 and PCM buffer section 13, respectively. However, if linear PCM data is included as audio data on a DVD, for example, then there is no need to perform the decoding operation. This is because the linear PCM data has been encoded but not compressed. Nevertheless, even if the audio data is linear PCM data, the audio data is still played back synchronously with the video in accordance with the sync information included in the stream. Thus, the same statement also applies to this situation, too. Furthermore, if the data processor 100 outputs an encoded stream such as Dolby Digital through an optical output terminal as it is, for example, then the stream may be temporarily stored in a stream buffer (not shown) with the STC checked, and then output by the audio output section 14 when the NAPTS reaches the STC.

Next, specific video processing to be carried out by the audiovisual unit 120 that causes the audio lag will be described. Examples of expected video processing include:
(1) processing of converting a film material with a frame rate of 24 frames per second into a video material with a frame rate of 30 frames per second;
(2) processing of converting interlaced scanning into progressive scanning, or vice versa, the processing of converting a standard definition (SD) D1 standard signal into a high definition (HD) D3 standard signal, or vice versa, or the processing of converting an NTSC-compliant format into a PAL-compliant format, or vice versa;
(3) processing of magnifying, reducing or editing the video in response to user's command, for example; and
(4) processing of combining multiple videos together. During a normal playback operation that needs none of these types of processing, there is no need to cause a lag in the output of the audio data. However, a delay may still be produced when the video processing is started or ended. Thus, the time lag also needs to be set and the audio data also needs to be output with that time lag.

In that case, the audio lag setting section 9 preferably retains multiple types of time lag information, which represent mutually different amounts of time lag and are associated with respective types of processing to carry out. The decoding section 60 may be designed so as to change the time lag according to the type of image processing to be carried out by the audiovisual unit 120 at the user's request, for example.

Hereinafter, three methods for calculating the time lag to be caused in the audio presentation time and getting the time lag automatically set by the audio lag setting section 9 will be described.

A first method is as follows. First, the data processor 100 decodes a synchronization checking test stream, represented by a signal with a particular pattern included in a video signal, and then sends the decoded stream to the audiovisual unit 120. Next, the audiovisual unit 120 captures the presented video that has been subjected to the video processing and measures its time delay. And a time lag, corresponding to the time delay measured, is set by the audio lag setting section 9. By getting these processing steps done automatically, the time lag to cause in the audio presentation time can be set automatically. Optionally, the time lags may be defined by measuring the time delays produced in the respective signal processing modes of the audiovisual unit 120. The test stream may be either input from a broadcasting system or read out from a test disk or a memory in the data processor 100. Alternatively, the incoming test stream may be replaced with a test pattern that will output pre-decoded video data. This is because the time delay caused by the video processing has only to be measured after the data has been decoded.

Next, a second method for automatically setting the time lag will be described. According to the second method, the four types of video processing (1) through (4), which cause time delays interfering with the video-audio synchronization, are not carried out by the audiovisual unit 120 but by the video output section 12 of the video decoding section 5. While the video output section 12 is performing such video processing, the decoding section 60 can calculate the time delay caused by the video processing. As a result, the audio lag setting section 9 can change the time lag in real time. In addition, the audiovisual unit 120 no longer needs to carry out the video processing and its load can be lightened.

Figure 11:
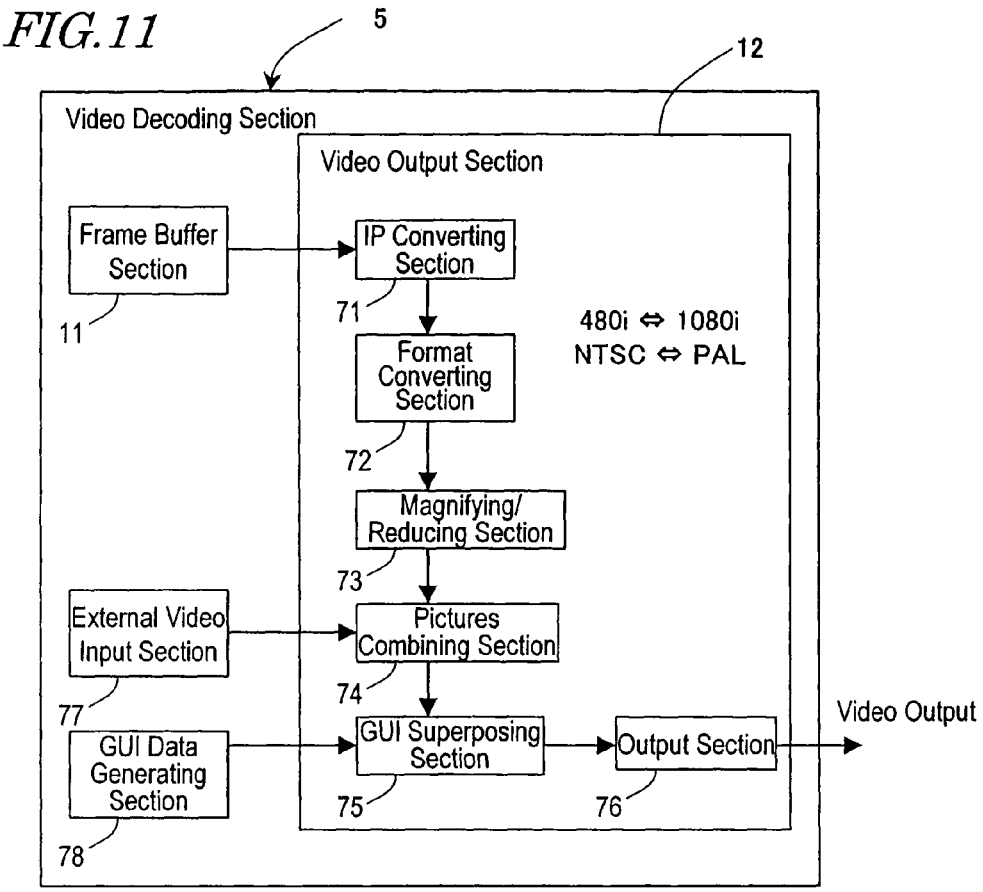
FIG. 11 shows the arrangement of functional blocks in a video output section 12 including a processor for performing video processing.

FIG. 11 shows the arrangement of functional blocks in the video output section 12 including a processor for performing the video processing. The video output section 12 receives decoded frame data from the frame buffer section 11 and outputs video data subjected to predetermined video processing. The video output section 12 includes an IP converting section 71, a format converting section 72, a magnifying/reducing section 73, a pictures combining section 74, a GUI superposing section 75, and an output section 76. The video decoding section 5 is additionally provided with an external video input section 77 and a GUI data generating section 78 for these components.

The IP converting section 71 performs the processing of converting interlaced scanning into progressive scanning, or vice versa. The format converting section 72 performs the processing of converting a 480$i$ video signal into a 1080$i$ video signal, or vice versa, and the processing of converting an NTSC-compliant format into a PAL-compliant format, or vice versa. The magnifying/reducing section 73 performs the processing of magnifying, reducing or editing the video at the user's command, for example. The pictures combining section 74 combines the decoded video with the video input from the external video input section 77. The GUI superposing section 75 superposes the GUI data, generated by the GUI data generating section 78, on the video obtained by these process steps. And the output section 76 outputs the resultant video data to the audiovisual unit 120. The video decoding section 5 finds the time when the video data is generated by reference to the STC and compares it to the VPTS of the video data, thereby calculating the time delay.

A third method for automatically setting the time lag will be described. According to the third method, the data processor 100 and the audiovisual unit 120 communicate with each other and the data processor 100 recognizes the type of the video processing being carried out by the audiovisual unit 120. In this manner, the decoding section 60 of the data processor 100 can figure out the time delay caused by the video processing in advance.

Figure 12:
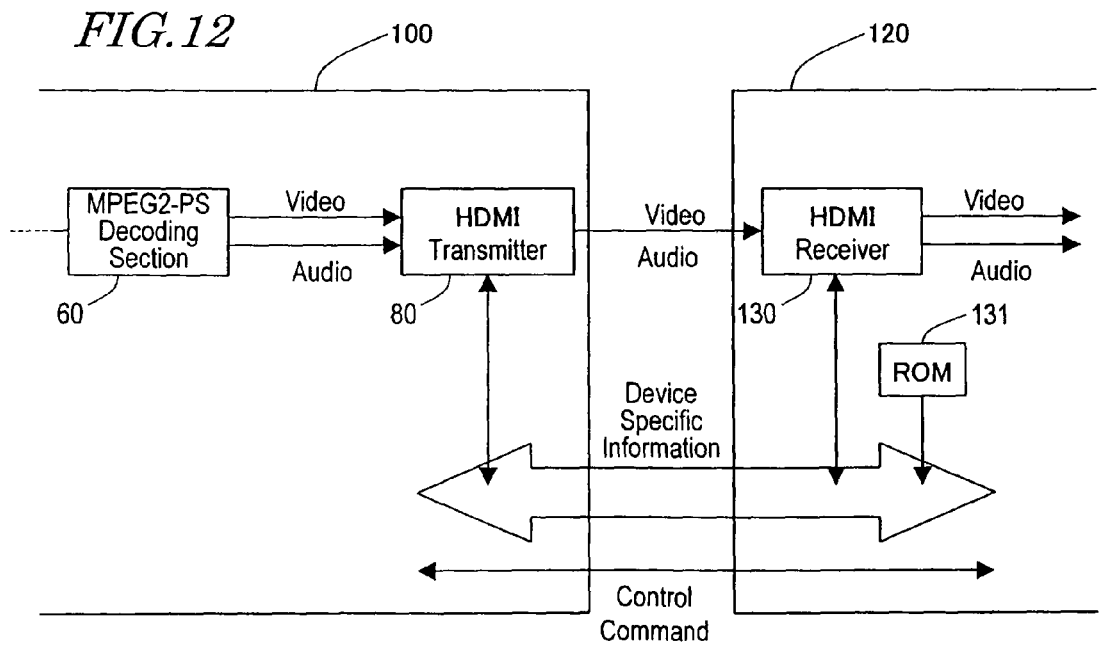
FIG. 12 shows how the data processor 100 and the audio-visual unit 120 may be connected together and what types of data are exchanged between them.

Hereinafter, this method will be described more specifically. FIG. 12 shows how the data processor 100 and the audiovisual unit 120 may be connected together and what types of data are exchanged between them. In the example illustrated in FIG. 12, the data are exchanged so as to comply with the HDMI standard. First, an HDMI transmitter 80 transmits a control command, which requests information to identify the audiovisual unit 120 (i.e., device specific information), to the HDMI receiver 130 of the audiovisual unit 120. In response to the control command, the HDMI receiver 130 transmits its own device ID as the device specific information to the HDMI transmitter 80. The device ID may be stored as vendor specific data in the ROM 131 of the audiovisual unit 120 and can be used to identify the name of the manufacturer and the product name of the device.

The HDMI transmitter 80 receives the device ID and outputs it to the decoding section 60. On receiving the device ID, the decoding section 60 makes reference to the table defined in either an internal memory or an external memory card, for example. The table describes correspondence between the device IDs and the delay settings. By reference to the devil ID and that table, the decoding section 60 can predict the time delay to be caused by the video processing carried out by the audiovisual unit 120. As a result, a time lag corresponding to the time delay can be set for the audio lag setting section 9. FIG. 12 shows an example in which the data processor 100 for decoding an MPEG-2 program stream is used. However, a stream to decode does not have to be such a stream. For example, an MPEG-2 transport stream representing a digital broadcast received and recorded may also be decoded. The decoding section 60 may be designed so as to perform a decoding operation according to the type of the given stream.

In the foregoing description, a system time clock STC is generated by reference to the system clock reference SCR, and VPTS defining a video presentation time and NAPTS defining a shifted audio presentation time are set by reference to the STC, thereby playing back video and audio synchronously with each other. Optionally, however, the audio may be played back by reference to the VPTS and the video may be played back by reference to the NAPTS.

In playing back an encoded content stored on the optical disk 110 with the encoded content edited such that the video is played back seamlessly even at the editing points, it is effective to carry out a time management by reference to the video presentation times. This means to manage the NAPTS by reference to the VPTS, which will be referred to herein as "video mastering". The system clock referencing section 4 generates the STC by reference to the VPTS, not the SCR, and carries out audio decoding such that the NAPTS falls within a predetermined precision range. And by skipping the playback of audio data until the time defined by the NAPTS exceeds the time defined by the VPTS, the system clock referencing section 4 plays back the video and audio synchronously with each other. The system clock referencing section 4 of the decoding section 60 confirms that the presentation time defined by the VPTS and the time defined by the NAPTS have fallen within a predetermined permissible range, and then manages the time by the video mastering technique, thereby realizing seamless editing and playback.

For example, if the video data is partially deleted and then the video needs to be played back seamlessly before and after the deletion point, then the video is played back based on the video data right after the deletion point and the STC, generated from the VPTS of the video data just before the deletion point, is changed into an STC generated from the VPTS of the video data right after the deletion point. Thereafter, the audio output is muted and then the playback of video and audio is synchronized together with the delay changed, thereby resuming the audio decoding operation. In this manner, the STC can also be changed by the video mastering technique even around the editing point and unnatural playback, e.g., freezing of a picture presented at the editing point, can be eliminated. Even in this case, however, the capacity of the audio buffer section 6 and the size of the table in the audio presentation time information management section 7 need to be increased so as to cover the audio lag.

In playing back an encoded content stored on the optical disk 110 such that the audio is played back seamlessly, it is effective to carry out a time management by reference to the audio presentation time NAPTS. This means to synchronize the VPTS with the NAPTS, which will be referred to herein as "audio mastering". The system clock referencing section 4 generates the STC by reference to the NAPTS not the SCR, and carries out video decoding such that the VPTS falls within a predetermined precision range. And by skipping the output of video appropriately or outputting the same picture a number of times, the system clock referencing section 4 plays back the video and audio synchronously with each other. Even if the time defined by the audio presentation time NAPTS is used as the audio master, the video is also output with the audio lag taken into account and the audio can also be played back synchronously with the delayed video. Even in this case, however, the capacity of the audio buffer section 6 and the size of the table in the audio presentation time information management section 7 also need to be increased so as to cover the audio lag.

For example, to maintain audio continuity when the output audio or music should be played back without a break (e.g., during fast forward or frame-by-frame playback), the video playback may sometimes be too long or too short. In that case, the same picture is presented over and over again, a certain number of frames are skipped, or any other type of processing is carried out.

To make the audio lag setting section 9 change the time lag setting, the audio output is either faded out or muted once to turn down the volume. Next, after the lag setting has been changed, the mute is disabled or the audio is faded in, thereby restoring the audio to the original volume.

In the foregoing description, the audio data and video data are supposed to be both included in the same data stream 10 shown in FIG. I and separated by the system decoding section 1 shown in FIG. 4. However, the audio data and the video data may be included as two independent streams. For example, the video data and audio data, captured with a camcorder, for example, may be edited on a PC and then separately input to the data processor 100 as a video elementary stream and an audio elementary stream, respectively. The present invention is applicable to any situation as long as the video and audio are played back synchronously with each other based on the presentation time information of the video data and that of the audio data.

In the preferred embodiment described above, the video and audio are supposed to be played back synchronously with each other. However, this is just an example. Alternatively, if the playback of a sub-picture on a DVD is delayed due to its video processing, for example, then the audio presentation time information NAPTS may also be produced so as to play back subtitles and audio synchronously with each other. The same statement applies to synchronizing a data broadcast with a satellite broadcast received and recorded. That is to say, if a processing delay is produced by the audiovisual unit 120 in the processing of superposing the data contents on the video, for example, then the audio presentation time information NAPTS is also produced and the video, data contents and audio can be played back synchronously with each other.

In the preferred embodiment described above, an NAPTS is obtained by adding a PTS, corresponding to the audio lag A t, to an APTS. Alternatively, an amount of time corresponding to At may be subtracted from a VPTS. In that case, however, the same effects are achieved by subtracting At from not only the VPTS but also from the system clock reference value itself as well. More particularly, in that case, the data processor 100 may be provided with means for subtracting an arbitrary lag setting time from the video presentation time information and means for subtracting an arbitrary lag setting time from the system clock reference value. Then, the video, for which the lag setting time has been subtracted, and the audio can be played back synchronously with each other with respect to the system clock reference value, from which the lag setting time has been subtracted in view of the delay to be caused by the video processing by the audiovisual unit 120.

Also, in the preferred embodiment described above, the playback of video is delayed due to image processing and lags behind that of audio. Conversely, however, the playback of audio may also be delayed due to various types of audio effect processing to be carried out after the data processor 100 has output the audio. In that case, the playback of video will precede that of audio. Accordingly, the playback of video and that of audio may be synchronized with each other by obtaining new video presentation time information NVPTS with a PTS corresponding to the time delay At added to the VPTS. Then, the capacity of the video buffer section 2 and the size of the table in the video playback management section 3 should be increased.

Each of the various buffers provided for the data processor 100 may be implemented as a semiconductor memory either partially or entirely or as a storage medium such as a hard disk.

The functions of the data processor 10 described above, and those of the decoding section 60 among other things, may be realized by executing a software program. For example, a CPU (not shown) may control the operations of the respective components by executing a computer program. The computer program may be defined so as to get the processing following the flowchart shown in FIG. 6 done on the data stream 10.

The computer program may be stored in any of various types of storage media. Examples of preferred storage media include optical storage media such as optical disks, semiconductor storage media such as an SD memory card and an EEPROM, and magnetic recording media such as a flexible disk. Instead of using such a storage medium, the computer program may also be downloaded via a telecommunications line (e.g., through the Internet, for example) and installed in the data processor 10.

Industrial Applicability

According to the present invention, a data processor that can play back video and audio, for example, synchronously with each other is provided. For instance, if the playback of video is delayed due to video processing, then the audio presentation time information is modified so as to cause a time lag, corresponding to the time delay of the video playback, in the audio presentation time. As a result, the video and audio can be played back synchronously with each other.

The invention claimed is:

1. A data processor comprising:
a receiving section for receiving a data stream that includes first data on a compressed and encoded video content, first time information setting the presentation time of the first data, second data on a different type of content from the video content, and second time information setting the presentation time of the second data;
a separating section for extracting the first data, the first time information, the second data and the second time information from the data stream;
a video decoding section for decoding the first data and outputting the first data decoded in accordance with the first time information;
a content decoding section for outputting the second data in accordance with the second time information; and
an output section for outputting the decoded first data output from the video decoding section and the second data output from the content decoding section to at least one external unit including a display device,
wherein the data processor includes a CPU and further includes a lag setting section for retaining lag information that defines how much lag should be caused in presentation time due to a video processing of the external unit in a situation where the first and second time information sets a time at which the first and second data are presented synchronously with each other, modifying the second time information according to the lag information, and causing the lag in time of outputting the second data from the content decoding section as compared to previously provided time for synchronizing with the decoded first data,
wherein the content represented by the second data has been compressed and encoded, and
wherein the data processor further includes a data buffer for storing the extracted second data, and
wherein the content decoding section includes an internal buffer,
wherein the content decoding section decodes the second data stored in the data buffer and stores the decoded second data in the internal buffer before the modified second time information reaches system time information,
wherein the receiving section receives the data stream continuously and the data buffer stores the second data sequentially, and
wherein the capacity of the data buffer is at least equal to the sum of the amount of the second data to receive before the presentation time, set by the second time information yet to be modified, is reached and the amount of the second data to receive before a period of time, corresponding to the lag of the presentation time, passes.

2. The data processor of claim 1, wherein the content represented by the second data has been compressed and encoded, and
wherein the content decoding section decodes the second data and includes an internal buffer for storing the second data decoded.

3. The data processor of claim 1, further comprising a management section for managing a table that defines a correlation between address information showing the storage location of the second data in the data buffer and the second time information yet to be modified for the second data.

4. The data processor of claim 3, wherein the management section manages the table for a portion of the second data.

5. The data processor of claim 1, wherein the receiving section receives a data stream including the second data on at least one of audio and subtitles.

6. The data processor of claim 1, wherein the lag setting section receives a value specifying the lag from a user and retains the value as the lag information.

7. The data processor of claim 1, wherein the lag setting section retains a predetermined value as the lag information.

8. The data processor of claim 7, wherein the lag setting section retains lag information that sets the lag of the presentation time at least equal to 30 milliseconds.

9. The data processor of claim 1, further comprising a transmitter for transmitting the first data to a connected device and receiving specific information, by which the device is to be identified, from the device,
    wherein the transmitter estimates, by reference to the specific information, an amount of time it will take for the device to carry out video processing on the first data, and
    wherein the lag setting section retains the lag information by regarding the estimated amount of time as the lag.

10. The data processor of claim 1, wherein the video and content decoding sections are implemented as a single decoder.

11. A data processing method comprising the steps of:
    receiving a data stream that includes first data on a compressed and encoded video content, first time information setting the presentation time of the first data, second data on a different type of content from the video content, and second time information setting the presentation time of the second data;
    extracting the first data, the first time information, the second data and the second time information from the data stream; and
    decoding the first data and outputting the first data decoded in accordance with the first time information,
    wherein if the first and second time information sets a time at which the first and second data are presented synchronously with each other, the method further includes the steps of:
    retaining lag information that defines how much lag should be caused in presentation time due to a video processing of at least one external unit including a display device;
    causing the lag in time of outputting the second data as compared to previously provided time for synchronizing with the decoded first data by modifying the second time information according to the lag information;
    outputting the second data in accordance with the second time information; and
    outputting the first data and the second data to the at least one external unit,
    wherein the content represented by the second data has been compressed and encoded,
    wherein the method further includes the steps of:
        storing the extracted second data in a data buffer; and
        decoding the second data stored in the data buffer and stores the decoded second data in an internal buffer before the modified second time information reaches system time information,
    wherein the step of receiving includes receiving the data stream continuously and the step of storing the second data includes storing the second data sequentially in the data buffer, and
    wherein the capacity of the data buffer is at least equal to the sum of the amount of the second data to receive before the presentation time, set by the second time information yet to be modified, is reached and the amount of the second data to receive before a period of time, corresponding to the lag of the presentation time, passes.

12. The data processing method of claim 11, wherein the content represented by the second data has been compressed and encoded, and
    wherein the step of outputting the second data includes decoding the second data, storing the second data decoded in a data buffer and then outputting the second data.

13. The data processing method of claim 11, further comprising the step of managing a table that defines a correlation between address information showing the storage location of the second data in the data buffer and the second time information yet to be modified for the second data.

14. The data processing method of claim 11, wherein the step of receiving includes receiving a data stream including the second data on at least one of audio and subtitles.

15. The data processing method of claim 11, wherein the step of causing the lag includes receiving a value specifying the lag from a user and retaining the value as the lag information.

16. The data processing method of claim 11, wherein the step of causing the lag includes retaining a predetermined value as the lag information.

* * * * *